United States Patent
Arora et al.

(10) Patent No.: US 10,701,539 B2
(45) Date of Patent: Jun. 30, 2020

(54) ENHANCED PUBLIC WARNING SYSTEM

(71) Applicant: QUALCOMM Incorporated, San Diego, CA (US)

(72) Inventors: Mayank Arora, Hyderabad (IN); Raghuveer Ramakrishna Srinivas Tarimala, Hyderabad (IN); Harish Singh Bisht, Hyderabad (IN); Abhishek Saurabh, Gaya (IN); Narasimhan Agaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/025,452

(22) Filed: Jul. 2, 2018

(65) Prior Publication Data

US 2020/0008037 A1   Jan. 2, 2020

(51) Int. Cl.
*H04W 4/90* (2018.01)
*H04W 68/00* (2009.01)

(52) U.S. Cl.
CPC .......... *H04W 4/90* (2018.02); *H04W 68/005* (2013.01)

(58) Field of Classification Search
CPC ............................... H04W 4/90; H04W 76/18
See application file for complete search history.

(56) References Cited

U.S. PATENT DOCUMENTS

| | | | |
|---|---|---|---|
| 2009/0239498 A1 | 9/2009 | Lee et al. | |
| 2010/0099439 A1 | 4/2010 | Aghili et al. | |
| 2010/0297979 A1* | 11/2010 | Watfa | H04W 8/205 455/404.1 |
| 2011/0045796 A1* | 2/2011 | Lee | H04W 4/90 455/404.1 |
| 2013/0185327 A1* | 7/2013 | Biesenbach | G06F 16/334 707/769 |
| 2014/0094139 A1* | 4/2014 | Xu | H04L 41/0893 455/406 |
| 2015/0281934 A1* | 10/2015 | Kawaguchi | H04W 48/20 370/259 |
| 2016/0234735 A1 | 8/2016 | Kubota et al. | |
| 2016/0381626 A1* | 12/2016 | Tsai | H04W 76/18 455/434 |

(Continued)

FOREIGN PATENT DOCUMENTS

| | | |
|---|---|---|
| EP | 2702784 A1 | 3/2014 |
| EP | 3226488 A1 | 10/2017 |
| WO | WO-2012149399 A1 | 11/2012 |

OTHER PUBLICATIONS

International Search Report and Written Opinion—PCT/US2019/039911—ISA/EPO—dated Sep. 25, 2019.

*Primary Examiner* — Myron Wyche
(74) *Attorney, Agent, or Firm* — Patterson + Sheridan, LLP

(57) ABSTRACT

An enhanced Public Warning System (PWS) is provided. A User Equipment (UE) transmits a first indication of UE capability for performing a first set of UE actions. The UE receives based on the first indication, a second indication of a second set of UE actions the UE is to perform in response to receiving a warning message, the warning message including an identifier of a warning type associated with the second set of UE actions. The UE receives the warning message including the identifier of the warning type. The UE performs at least one of the second set of UE actions in response to receiving the warning message.

30 Claims, 13 Drawing Sheets

(56) References Cited

U.S. PATENT DOCUMENTS

2016/0381720 A1     12/2016  Baek et al.
2017/0251500 A1*     8/2017  Agiwal .................. H04W 4/06
2018/0007525 A1      1/2018  Subramanian et al.
2018/0109972 A1      4/2018  Kim et al.

* cited by examiner

ENHANCED PUBLIC WARNING SYSTEM

INTRODUCTION

Field of the Disclosure

Aspects of the present disclosure relate to wireless communications, and more particularly, to an enhanced public warning system (PWS).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a User Equipment (UE). The method generally includes transmitting a first indication of UE capability for performing a first set of UE actions; receiving, based on the first indication, a second indication of a second set of UE actions the UE is to perform in response to receiving a warning message, the warning message including an identifier of a warning type associated with the second set of UE actions; receiving the warning message including the identifier of the warning type, and performing at least one of the second set of UE actions in response to receiving the warning message.

Certain aspects of the present disclosure provide a method for wireless communication by a network node. The method generally includes obtaining a first set of defined UE actions corresponding to each of a set of warning types, each warning type identified by an identifier, receiving, from a User Equipment (UE), a first indication of UE capability for performing a second set of UE actions, determining, for each warning type in the set of warning types, based on the second set of UE actions and the first set of UE actions defined for the warning type, a third set of UE actions to be performed by the UE for the warning type, and transmitting, for the warning type to the UE, a second indication of the third set of UE actions and an identifier of the warning type.

Certain aspects of the present disclosure provide an apparatus for wireless communication by a User Equipment (UE). The apparatus generally includes at least one processor and a memory coupled to the at least one processor. The at least one processor is generally configured to transmit a first indication of UE capability for performing a first set of UE actions, receive, based on the first indication, a second indication of a second set of UE actions the UE is to perform in response to receiving a warning message, the warning message including an identifier of a warning type associated with the second set of UE actions, receive the warning message including the identifier of the warning type, and perform at least one of the second set of UE actions in response to receiving the warning message.

Certain aspects of the present disclosure provide an apparatus for wireless communication by a network node. The apparatus generally includes at least one processor and a memory coupled to the at least one processor. The at least one processor is generally configured to obtain a first set of defined UE actions corresponding to each of a set of warning types, each warning type identified by an identifier, receive, from a User Equipment (UE), a first indication of UE capability for performing a second set of UE actions, determine, for each warning type in the set of warning types, based on the second set of UE actions and the first set of UE actions defined for the warning type, a third set of UE actions to be performed by the UE for the warning type, and transmit, for the warning type to the UE, a second indication of the third set of UE actions and an identifier of the warning type.

Certain aspects of the present disclosure provide an apparatus for wireless communication by a User Equipment (UE). The apparatus generally includes means for transmitting a first indication of UE capability for performing a first set of UE actions, means for receiving, based on the first indication, a second indication of a second set of UE actions the UE is to perform in response to receiving a warning message, the warning message including an identifier of a warning type associated with the second set of UE actions, means for receiving the warning message including the identifier of the warning type, and means for performing at least one of the second set of UE actions in response to receiving the warning message.

Certain aspects of the present disclosure provide an apparatus for wireless communication by a network node. The apparatus generally includes means for obtaining a first set of defined UE actions corresponding to each of a set of warning types, each warning type identified by an identifier, means for receiving, from a User Equipment (UE), a first indication of UE capability for performing a second set of UE actions, means for determining, for each warning type in the set of warning types, based on the second set of UE actions and the first set of UE actions defined for the warning type, a third set of UE actions to be performed by the UE for the warning type, and means for transmitting, for the warning type to the UE, a second indication of the third set of UE actions and an identifier of the warning type.

Certain aspects of the present disclosure provide a computer-readable medium for wireless communication by a User Equipment (UE). The computer-readable medium stores instructions which when processed by at least one processor performs a method generally including transmitting a first indication of UE capability for performing a first set of UE actions, receiving, based on the first indication, a second indication of a second set of UE actions the UE is to perform in response to receiving a warning message, the warning message including an identifier of a warning type associated with the second set of UE actions, receiving the warning message including the identifier of the warning type, and performing at least one of the second set of UE actions in response to receiving the warning message.

Certain aspects of the present disclosure provide a computer-readable medium for wireless communication by a network node. The computer-readable medium stores instructions which when processed by at least one processor performs a method generally including obtaining a first set of defined UE actions corresponding to each of a set of warning types, each warning type identified by an identifier, receiving, from a User Equipment (UE), a first indication of UE capability for performing a second set of UE actions, determining, for each warning type in the set of warning types, based on the second set of UE actions and the first set of UE actions defined for the warning type, a third set of UE actions to be performed by the UE for the warning type, and transmitting, for the warning type to the UE, a second indication of the third set of UE actions and an identifier of the warning type To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
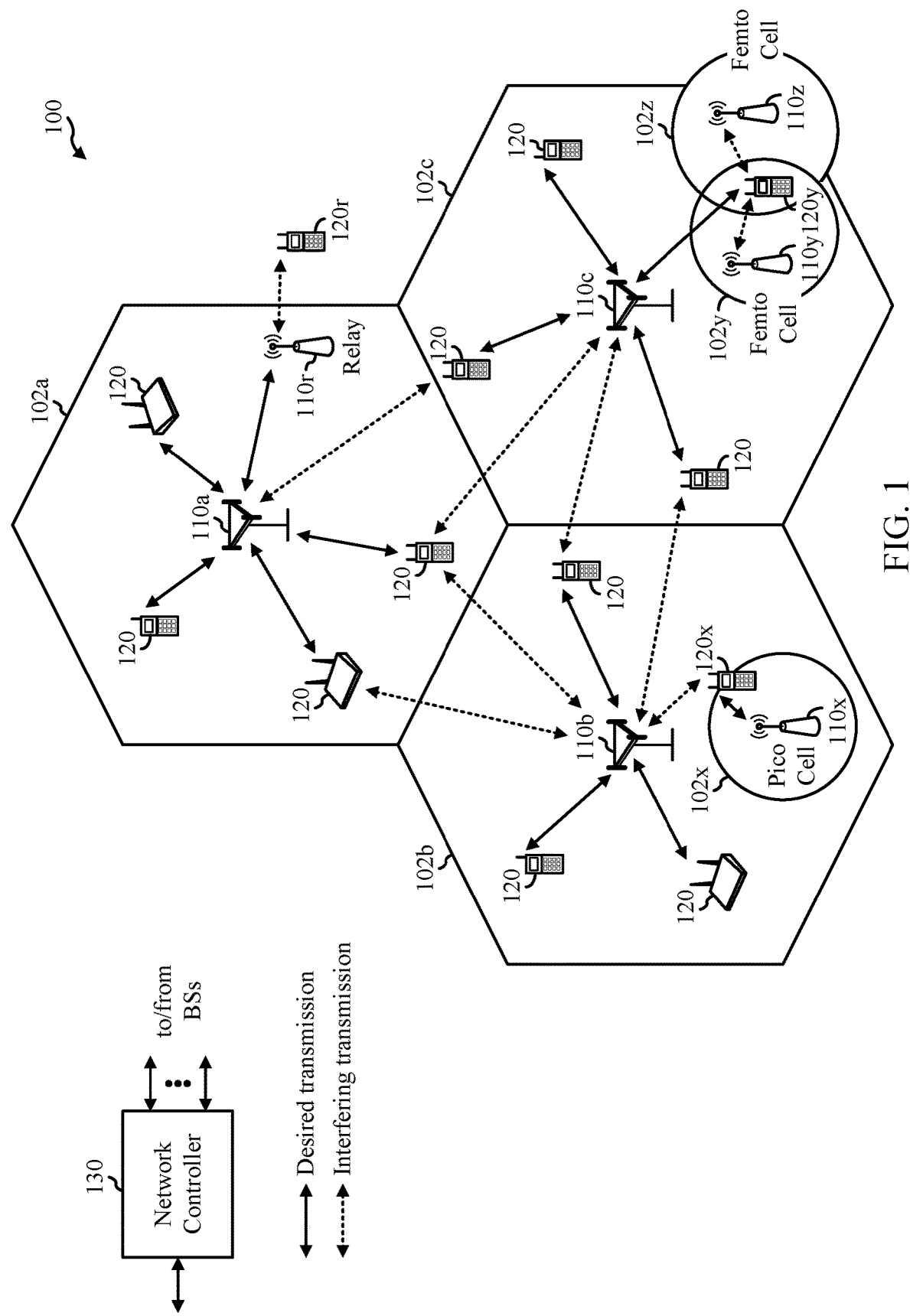
FIG. 1 is a block diagram conceptually illustrating an example telecommunications system, in accordance with certain aspects of the present disclosure.

Public warning system (PWS) is a mechanism in 3GPP specifications to notify the occurrence of natural calamities like earthquakes, tsunamis, etc., to end users in a cellular network. The existing PWS is not completely suitable for the varied categories of 5G UEs (e.g., Internet of Things (IoT) devices). Several problems exist with the current PWS in the context of 5G UEs. For instance the current PWS message format and content is only text based and hence does not have an automated actionable response from the devices without human intervention. In fact, the current PWS does not take into consideration UE capability to act upon the PWS text information. Thus, a 5G UE (e.g., an IoT device) may not be equipped to act on a PWS text message received from the network.

Aspects of the present disclosure describe an enhanced PWS that enables a UE to perform one or more automated actions in response to receiving a warning message from the PWS, for example without human intervention. Warning messages from the enhanced PWS may be interpreted and acted upon by any type of UE including 5G UEs based on UE capabilities.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

In certain aspects, a network node (e.g., Base Station 110) obtains a first set of defined UE actions corresponding to each of a set of warning types, each warning type identified by an identifier. The BS 110 receives, from a User Equipment (UE), a first indication of UE capability for performing a second set of UE actions. The BS 110 determines, for each warning type in the set of warning types, based on the second set of UE actions and the first set of UE actions defined for the warning type, a third set of UE actions to be performed by the UE for the warning type. The BS 110 transmits, for the warning type to the UE, a second indication of the third set of UE actions and an identifier of the warning type.

In certain aspects, a User Equipment (e.g., UE 120) transmits a first indication of UE capability for performing a first set of UE actions. The UE 120 receives, based on the first indication, a second indication of a second set of UE actions the UE is to perform in response to receiving a warning message, the warning message including an identifier of a warning type associated with the second set of UE actions. The UE 120 receives the warning message including the identifier of the warning type. The UE 120 performs at least one of the second set of UE actions in response to receiving the warning message.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
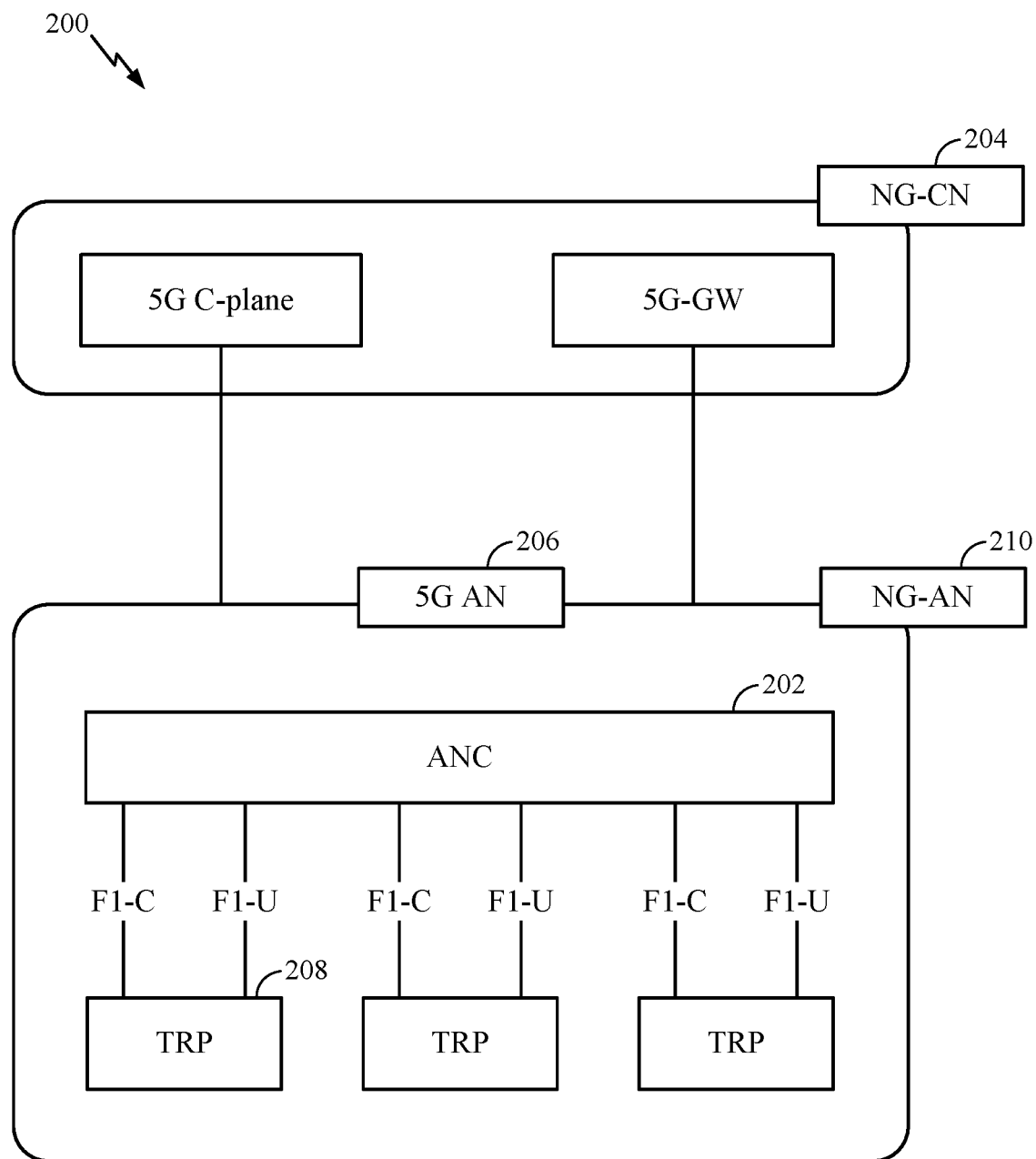
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

In certain aspects, a network node (e.g., NG-CN 204) obtains a first set of defined UE actions corresponding to each of a set of warning types, each warning type identified by an identifier. The NG-CN 204 receives, from a User Equipment (UE), a first indication of UE capability for performing a second set of UE actions. The NG-CN 204 determines, for each warning type in the set of warning types, based on the second set of UE actions and the first set of UE actions defined for the warning type, a third set of UE actions to be performed by the UE for the warning type. The NG-CN 204 transmits, for the warning type to the UE, a second indication of the third set of UE actions and an identifier of the warning type.

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
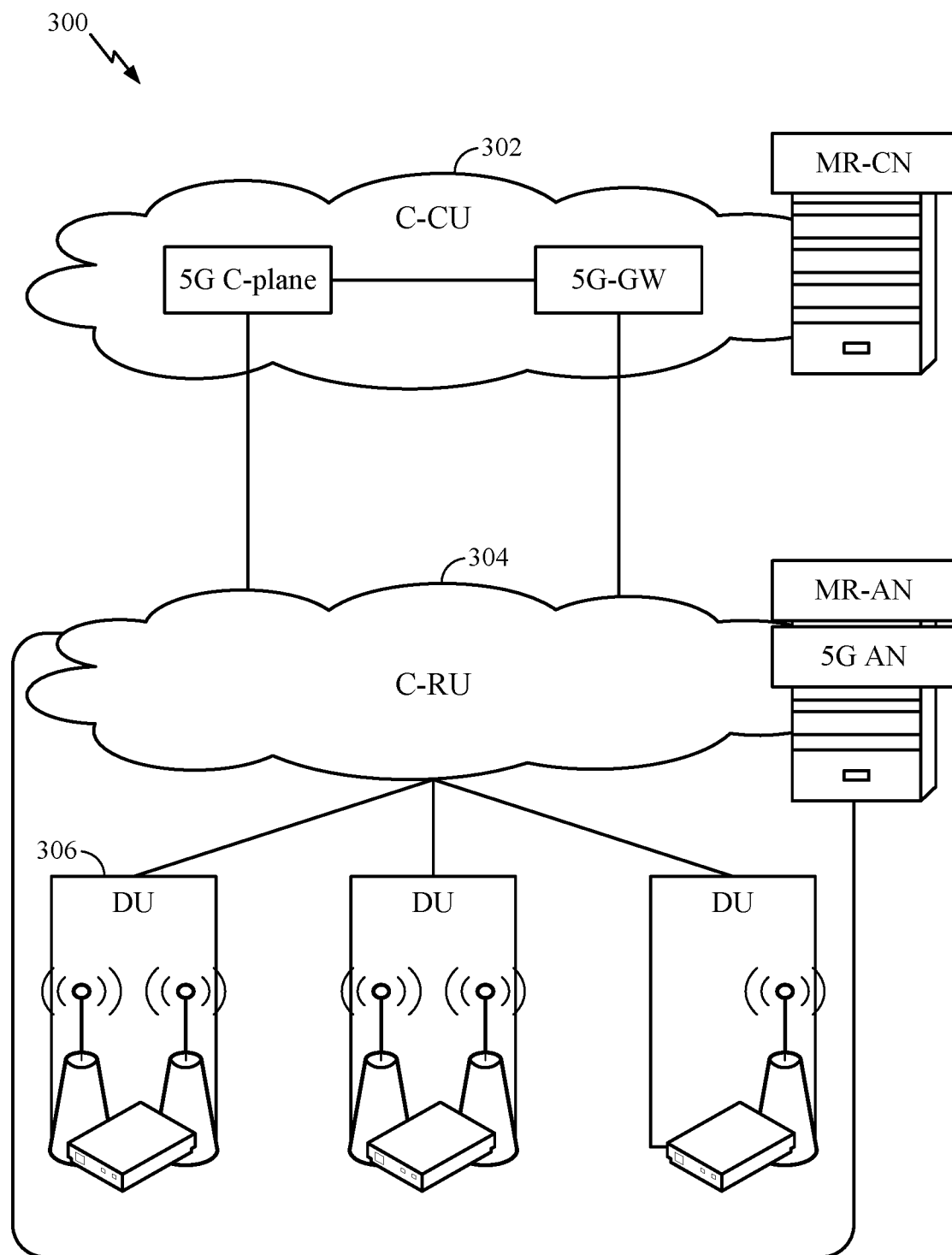
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
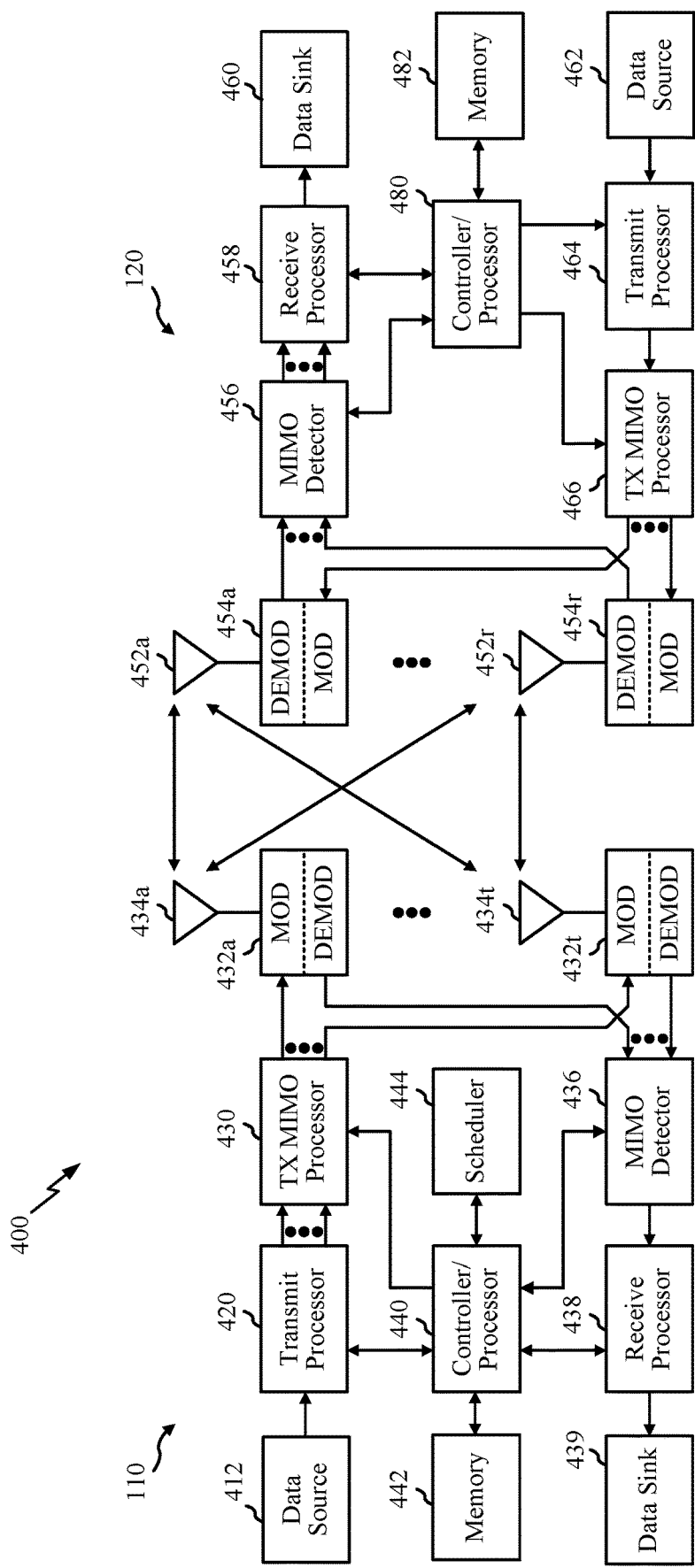
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
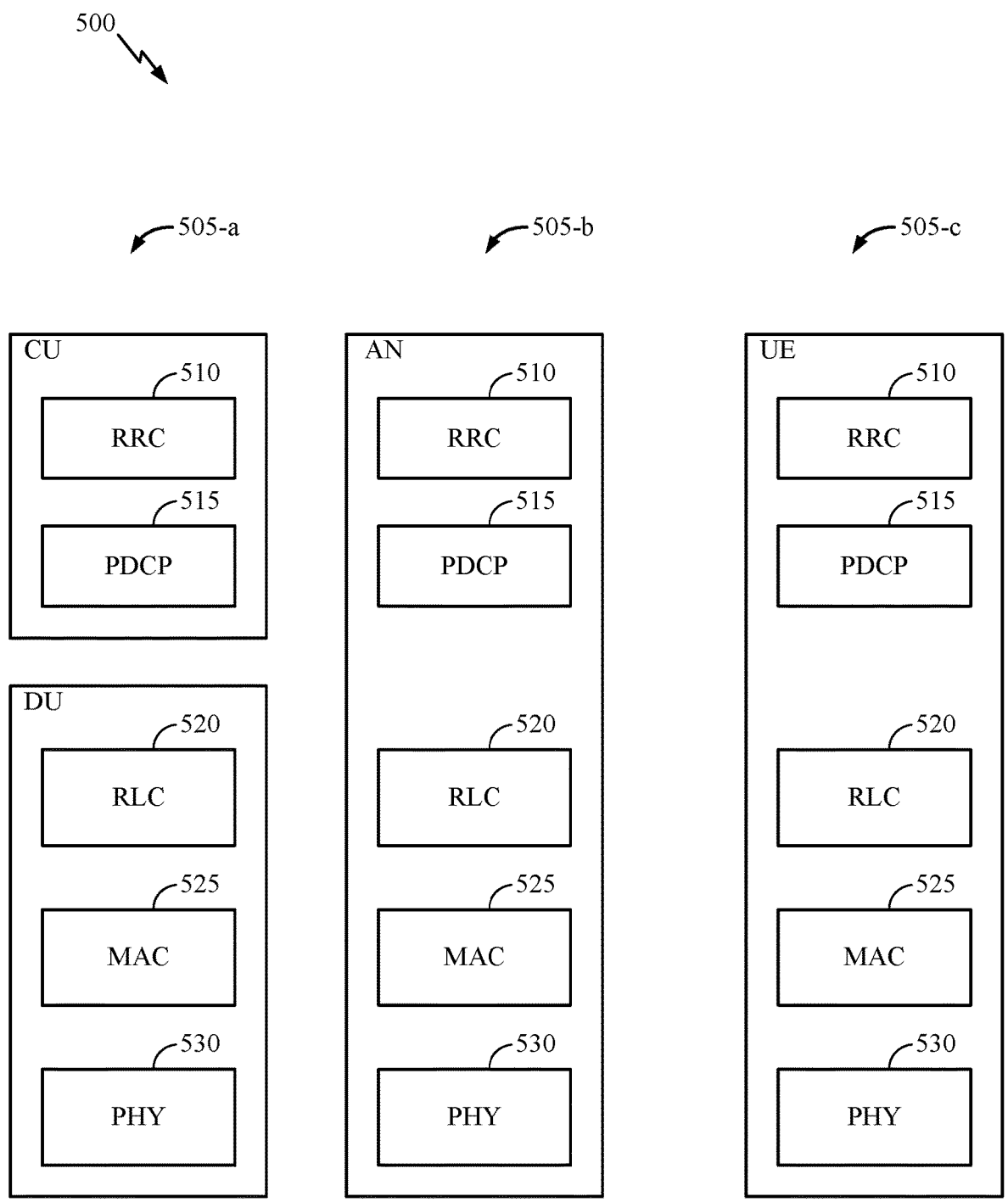
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
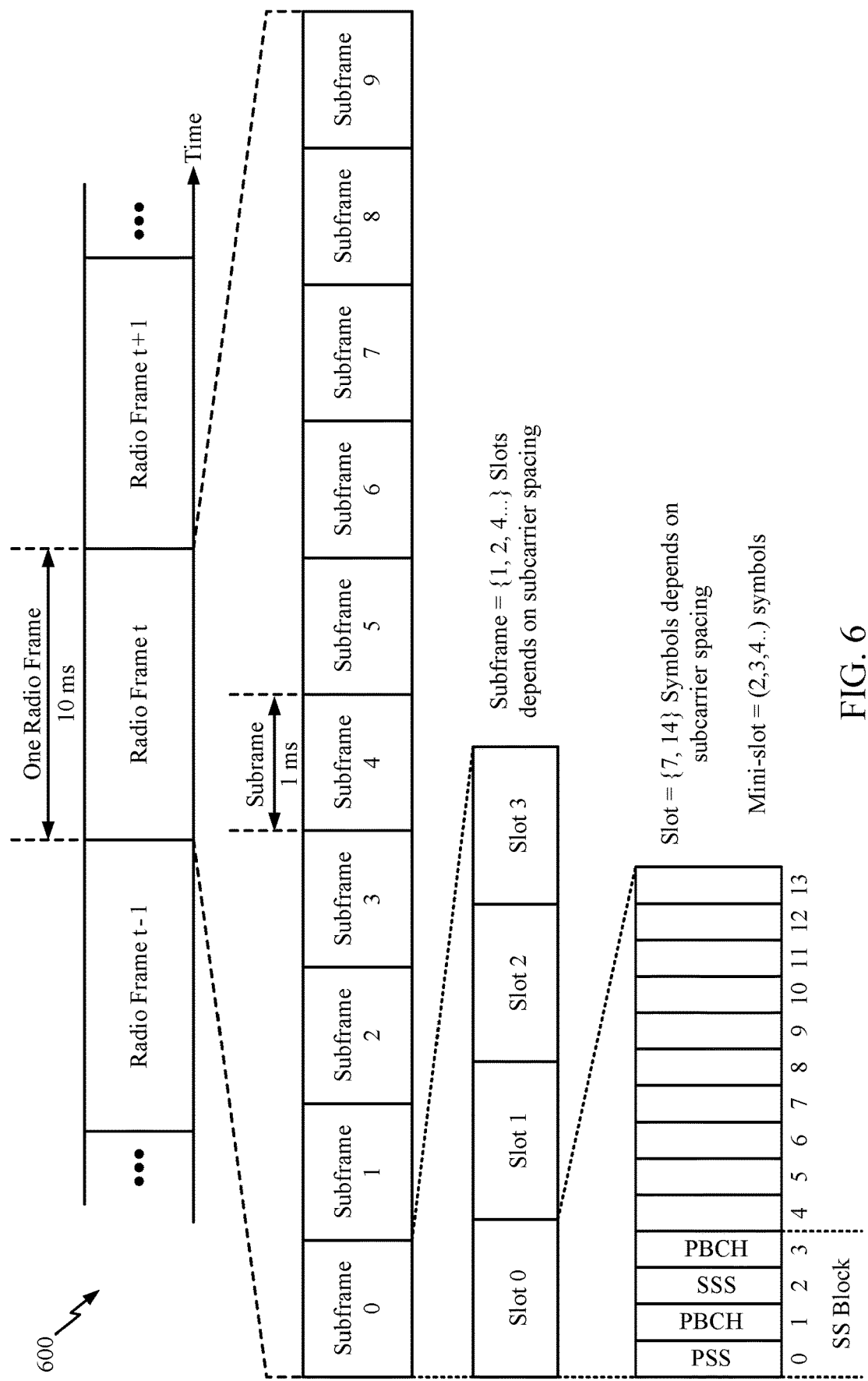
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping.

Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Enhanced Public Warning System

Public warning system (PWS) is a mechanism in 3GPP specifications to notify the occurrence of natural calamities like earthquakes, tsunamis, etc., to the end users in a cellular network. The existing PWS is not completely suitable for the varied categories of 5G UEs (e.g., Internet of Things (IoT) devices). Several problems exist with the current PWS in the context of 5G UEs. For instance the current PWS message format and content is only text based and hence does not have an automated actionable response from the devices without human intervention. In fact, the current PWS does not take into consideration UE capability to act upon the PWS text information. Thus, a 5G UE (e.g., an IoT device) may not be equipped to act on a PWS text message received form the network.

In the existing PWS, a 'Warning-Type' Information Element (IE) is broadcasted in the System Information Block (SIB) Type 10 message which includes an indication of a type of natural calamity. The PWS text message is conveyed in a 'dummy' IE of the SIB Type 10 message. The 3GPP standards committee is looking for proposals for enhancing the existing PWS mechanism that addresses the above discussed problems in the context of 5G devices.

Aspects of the present disclosure describe an enhanced PWS that enables a UE to perform one or more automated actions in response to receiving a warning message from the PWS, for example without human intervention. Warning messages from the enhanced PWS may be interpreted and acted upon by any type of UE including 5G UEs based on UE capabilities.

In certain aspects, in accordance with the enhanced PWS, the network maintains a set of UE actions defined for each warning type. In an aspect, each warning type is identified by a unique identifier (ID). In an aspect, the network maintains the sets of UE actions defined for the warning types in the form of bitmaps, wherein each bit in a bitmap corresponds to a UE action. The warning types may include any type of emergency including natural disasters like an earthquake, tsunami, hurricane, tornadoes, flash floods, etc.

Each UE, during an attach procedure with the network (e.g. as part of ATTACH REQUEST), transmits UE capability information including information relating to a set of UE actions supported by the UE. In an aspect, the UE transmits the information relating to the UE actions supported by the UE in the form of a bitmap of the UE actions, wherein each bit in the bitmap corresponds to a UE action. For each warning type, the network compares the UE actions supported by the UE with UE actions defined by the network for the warning type, and determines a set of UE actions to be performed by the UE for the warning type. Thus, for each warning type the network derives a set of UE actions to be performed by a particular UE that is specific to the UE.

In an aspect, to derive a UE-specific set of UE actions for each warning type, the network AND masks the bitmap of the UE supported actions received from the UE with the network defined bitmap of UE actions for the warning type, and determines the UE specific UE action bitmap for the warning type. Thus, the UE-specific action bitmap includes only those actions that are supported both by the network and the UE for a particular warning type. For each warning type, the network conveys (e.g., in an ATTACH_ACCEPT message) to the UE, the UE-specific action bitmap along with a corresponding identifier of the warning type. In an aspect, for a given UE, the network derives a separate UE-specific action bitmap for each warning type including UE actions to be performed by the UE for the warning type. Thus, each UE-specific action bitmap derived by the network is both UE-specific and warning type-specific. The network conveys to the UE a separate UE specific action bitmap for each warning type.

During an emergency situation, the network broadcasts an ID corresponding to a warning type associated with the emergency. The UE receives the ID and performs the actions associated with the warning type based on the previously received UE specific action bitmap associated with the warning type/ID. In an aspect, the network broadcasts the ID of the warning type by using resources assigned for the existing PWS. For example, the network transmits the ID as part of the Warning-Type IE in the SIB Type 10 message.

In an aspect, as the UE action bitmaps for each warning type are UE-specific, different UEs may interpret the same ID differently as the different UEs may have different action bitmaps associated with the same ID, and may thus perform a different set of actions based on their respective action bitmaps.

Figure 7:
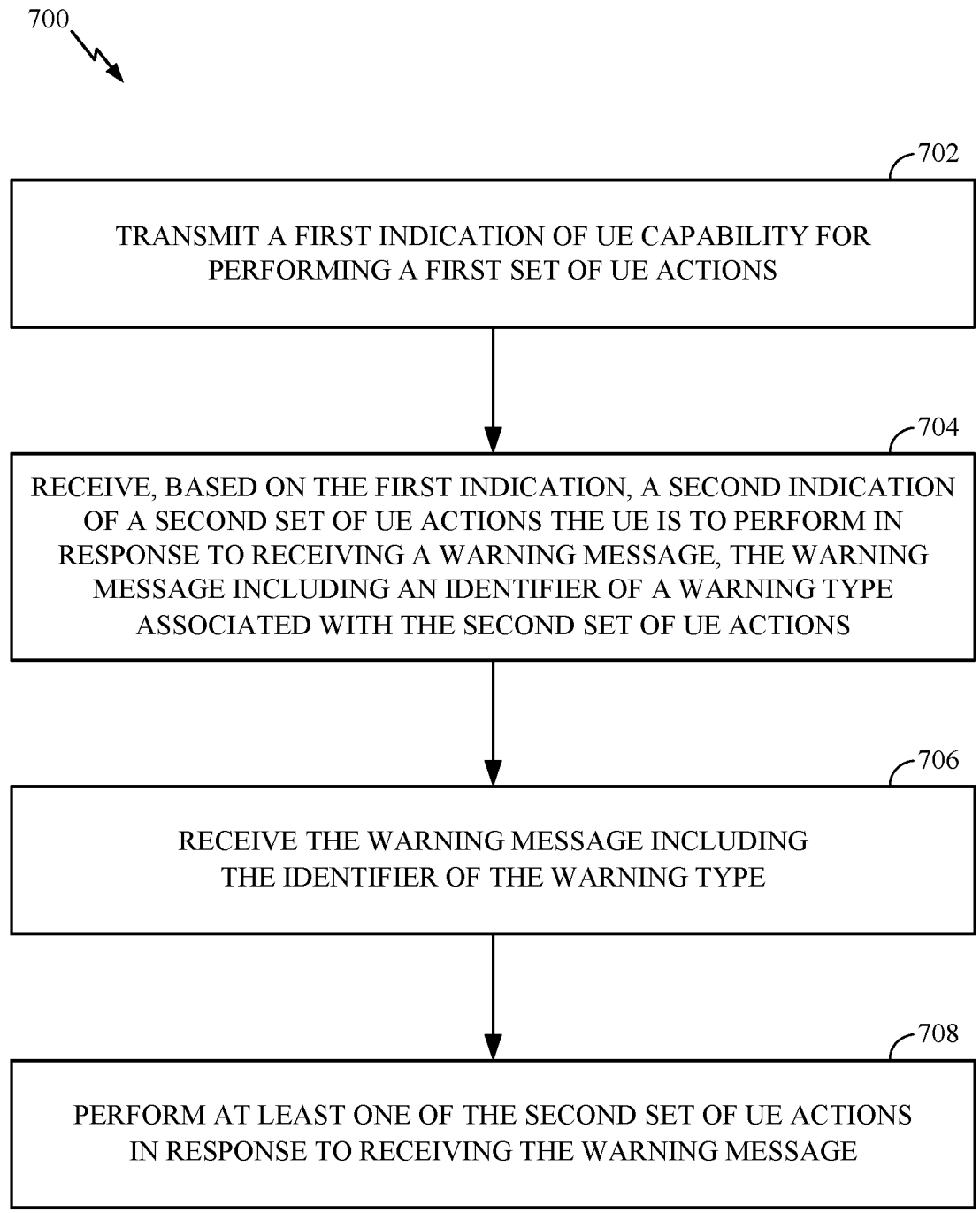
FIG. 7 illustrates example operations performed by a UE in an enhanced PWS, in accordance with certain aspects of the present disclosure.

FIG. 7 illustrates example operations 700 performed by a UE in an enhanced PWS, in accordance with certain aspects of the present disclosure. Operations 700 begin, at 702 by transmitting a first indication of UE capability for performing a first set of UE actions. At 704, the UE receives, based on the first indication, a second indication of a second set of UE actions the UE is to perform in response to receiving a warning message, the warning message including an identifier of a warning type associated with the second set of UE actions. At 706, the UE receives the warning message including the identifier of the warning type. At 708, the UE performs at least one of the second set of UE actions in response to receiving the warning message.

In an aspect, the UE transmits the first indication of UE capability and receives the second indication of the second set of UE actions during a UE attach procedure to a Radio Access Network (RAN). In an aspect, the first set of UE actions includes UE actions supported by the UE and the second set of UE actions includes UE actions to be performed by the UE in response to receiving the identifier of the warning type.

Figure 8:
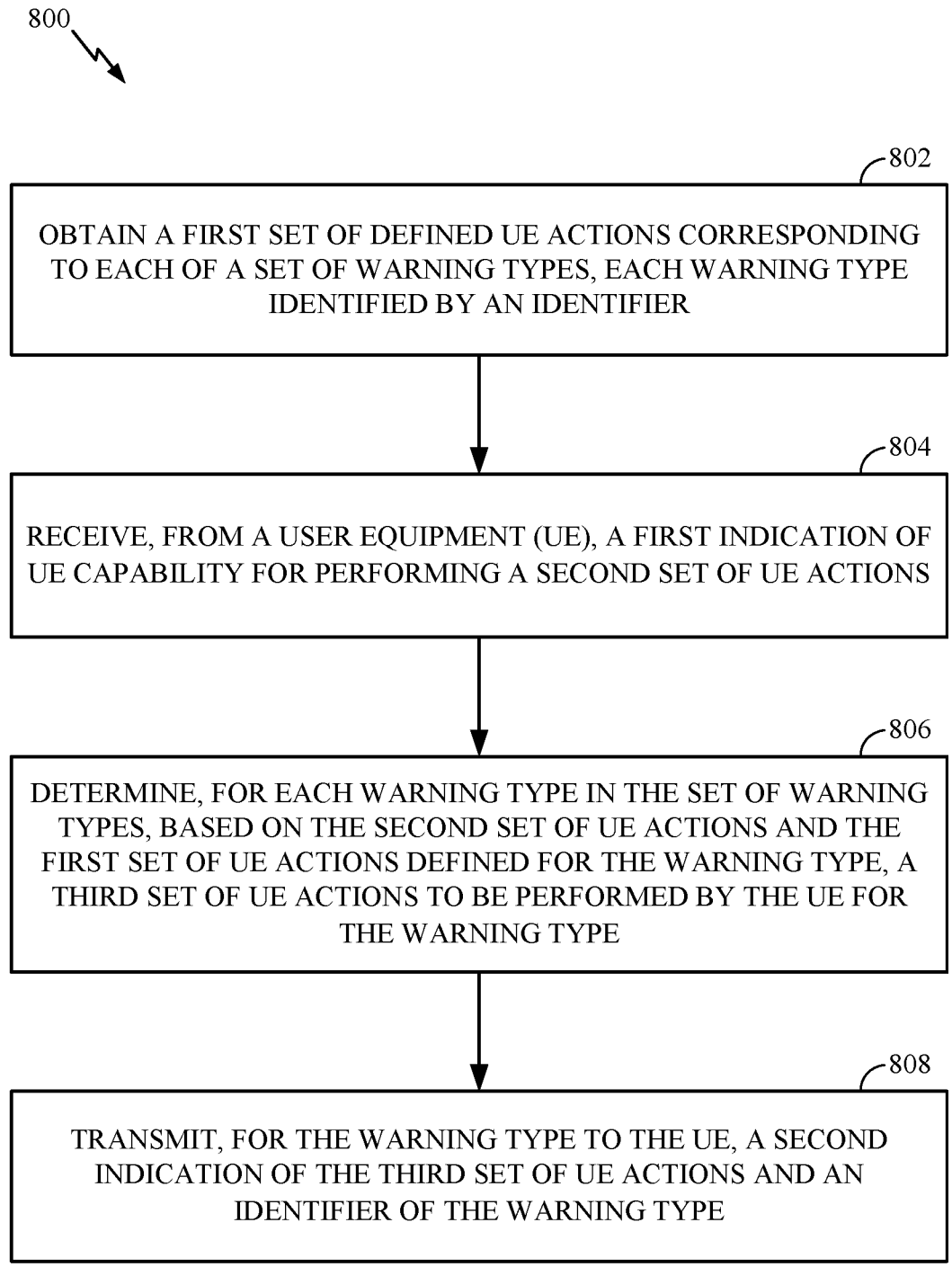
FIG. 8 illustrates example operations performed by a network node in an enhanced PWS, in accordance with certain aspects of the present disclosure.

FIG. 8 illustrates example operations 800 performed by a network node in an enhanced PWS, in accordance with certain aspects of the present disclosure. Operations 800 begin, at 802, by obtaining a first set of defined UE actions corresponding to each of a set of warning types, each warning type identified by an identifier. At 804, the network node receives, from a UE, a first indication of UE capability for performing a second set of UE actions. At 806, the network node determines, for each warning type in the set of warning types, based on the second set of UE actions and the first set of UE actions defined for the warning type, a third set of UE actions to be performed by the UE for the warning type. At 808, the network node transmits, for the warning type to the UE, a second indication of the third set of UE actions and an identifier of the warning type.

In an aspect, the network node transmits a warning message including the identifier of the warning type to trigger the UE to perform at least one action from the third set of UE actions. In an aspect, the first set of UE actions includes network defined UE actions for each warning type, the second set of UE actions includes UE actions supported by the UE, and the third set of UE actions includes UE actions to be performed by the UE in response to receiving the identifier of the warning type.

Figure 9:
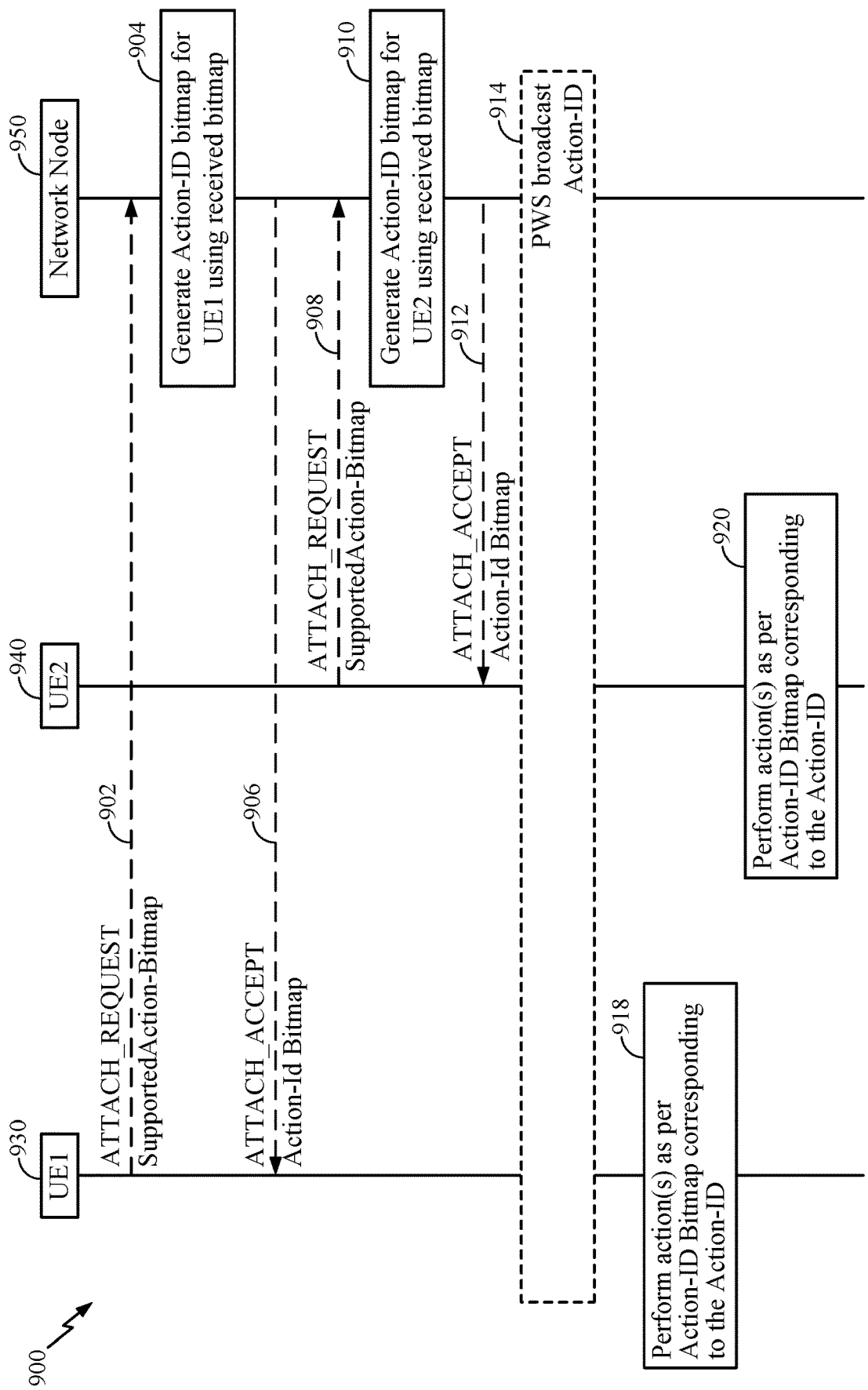
FIG. 9 illustrates an example call flow for the enhanced PWS in accordance with certain aspects of the present disclosure.

FIG. 9 illustrates an example call flow 900 for the enhanced PWS in accordance with certain aspects of the present disclosure. Call flow 900 shows signals exchanged between UE1, 930 and UE2, 940 and a network node 950. In an aspect, the network node may be a core network (CN) entity or a base station (e.g., gNB), or a combination thereof.

As shown in call flow 900, at 902, UE1, during an attach procedure with a network associated with the network node 950, transmits to the network node 950 a bitmap of UE actions supported by UE1 (SupportedAction-Bitmap for UE1) as part of the ATTACH REQUEST message. At 904, the network node 950 generates a bitmap of UE actions (Action-Id bitmap) to be performed by UE1 for a particular warning type (identified by an associated unique Action-Id), based on the received SupportedAction-Bitmap for UE1 and a bitmap of UE actions defined for the warning type (e.g., $B_{NW\_Possible\_Actions}$). At 906, the network node 950 transmits the determined UE1-specific Action-Id bitmap to UE1 in an ATTACH_ACCEPT message. In an aspect the network node 950 also transmits the Action-Id of the warning type for which the UE1-specific Action-Id bitmap was generated.

Similarly, at 908, UE2, during an attach procedure with the network, transmits to the network node 950 a bitmap of UE actions supported by UE2 (SupportedAction-Bitmap for UE2) as part of the ATTACH REQUEST message. At 910, the network node 950 generates a bitmap of UE actions (Action-Id bitmap) to be performed by UE2 for the same warning type (identified by the same Action-Id), based on the received SupportedAction-Bitmap for UE2 and the set of UE actions defined for the warning type (e.g., $B_{NW\_Possible\_Actions}$). At 912, the network node 950 transmits the determined UE2-specific Action-Id bitmap to UE2 in an ATTACH_ACCEPT message. It may be noted that the set of UE actions defined by the network for the warning type ($B_{NW\_Possible\_Actions}$) is same for all UEs. In an aspect the network node 950 also transmits the Action-Id of the warning type for which the UE2-specific Action-Id bitmap was generated.

As shown in call flow 900, at 914, during an emergency situation relating to the warning type identified by the Action-Id, the network node 950 broadcasts a PWS message including the Action-Id of the warning type. At 918 and 920, each of UE1 and UE2 performs actions as per their respective UE-specific Action-Id bitmaps previously received from the network node 950 corresponding to the Action-Id.

It may be noted that FIG. 9 shows a call flow for only one warning type for ease of illustration. The network may similarly derive and transmit UE-specific action-Id bitmaps for multiple warning types during the UE attach procedure.

In an aspect, the network node 950 maintains a table which maps each warning type and a corresponding unique Action-Id to a bitmap of possible UE actions ($B_{NW\_Possible\_Actions}$) defined for the warning type. Upon receiving the UE supported actions, the network node 950 performs AND masking between SupportedAction-Bitmap and $B_{NW\_Possible\_Actions}$ to derive the UE-specific Action-Id bitmap.

Figure 10:
FIG. 10 illustrates an example table showing an example generation of an Action-Id bitmap by a network node, in accordance with certain aspects of the present disclosure.

FIG. 10 illustrates an example table 1000 showing an example generation of an Action-Id bitmap by a network node, in accordance with certain aspects of the present disclosure.

Each row of Table 1000 is assigned for a particular type of warning as listed in column 1004 assigned for "Existing Warning Type". As shown in column 1004, the warning types include Earthquake, Tsunami, Earthquake and Tsunami, Test (e.g., used for testing the PWS), and other warning types.

Each warning type is identified by an "Existing Warning Type value" according to the existing PWS as shown in column 1002 and a unique "Action-Id" according to the enhanced PWS as shown in column 1006. It may be noted that while table 1000 shows that the "Existing Warning Type value" and "Action-Id" for each warning type have the same values, the values of the Action-Ids may be different from the "Existing Warning Type values".

Column 1008 assigned for "Network defined possible action bitmap, $B_{NW\_Possible\_Actions}$", includes a bitmap of possible UE actions defined for each warning type.

Column 1010 assigned for "UE Supported Actions, SupportedAction-Bitmap" includes a bitmap of UE actions supported by a single UE, for example, as received from the UE.

Column 1012 assigned for "Action-Id Bitmap" includes a bitmap of UE-actions to be performed by the UE as derived by the network.

In an aspect, the network maintains a separate table for each UE or has additional columns for "UE Supported Actions" and corresponding UE-specific "Action-Id Bitmaps" for each UE.

Table 1000 shows an example generation of an Action-Id Bitmap for an Earthquake identified by Action-Id value of '0'. As shown, in column 1008 the network defines "Location update", "Power off" and "Alarm" as UE actions that may be performed by any UE in response to an Earthquake. Each UE action is defined by one bit. As shown a value of '1' indicates that the UE action is defined for the warning type and a value of '0' indicates that the UE action is not defined for the warning type. Column 1008 only shows the UE actions defined in the event of an Earthquake. As shown, the defined UE actions for an Earthquake is represented by the bitmap "0b00000111", wherein bit 0 (Least Significant bit) indicates "Alarm", bit 1 indicates "Power off" and bit 2 indicates "Location update". Each '0' in the bitmap indicates UE actions not defined for Earthquake. In alternative aspects, a defined UE action may be defined by the value of '0' and an undefined UE action may be defined by value of '1'.

As shown in column 1010 the UE only supports "Power off" (bit 1) and "Alarm" (bit 0) as indicated in the SupportedAction-Bitmap "0b00000011". The UE does not support "Location update" indicated by the value '0' of bit 2 from the right in the SupportedAction-Bitmap. In an aspect, the bit positions for each UE action is the same in the $B_{NW\_Possible\_Actions}$ and the SupportedAction-Bitmap for each UE, and may be pre-configured by the network and signaled to the UE.

As shown in column 1012, the network performs an AND operation between the $B_{NW\_Possible\_Actions}$ and the SupportedAction-Bitmap to determine the UE-specifc-Action-Id Bitmap for the warning type "Earthquake". Thus, the UE-specific Action-Id Bitmap for "Earthquake" is given by, ($B_{NW\_Possible\_Actions}$=0b00000111) AND (SupportedAction-Bitmap=0b00000011)=0b00000011

UE-specific Action-Id Bitmap "0b00000011" indicates that the UE is to sound an "Alarm" and "Power down" in the event of an Earthquake. The network transmits the derived UE-specific Action-Id Bitmap (0b00000011) to the UE along with the Action-Id value of '0' mapped to "Earthquake". In an aspect, the UE maintains (e.g., in a local storage) a table mapping each Action-Id to a corresponding Action-Id Bitmap received from the network. In an aspect, the sequence in which the UE actions are to be performed are pre-configured or signaled by the network.

In the event of an "Earthquake", the network broadcasts a PWS message and includes the Action-Id as part of the Warning-Type IE in SIB 10. The UE, upon receiving the PWS message, retrieves the Action-Id Bitmap corresponding to the received Action-Id (e.g., from local storage) and performs the UE actions as dictated by the Action-Id Bitmap. In this example, the UE sound an "Alarm" and "Powers down" in the event of an Earthquake.

Figure 11:
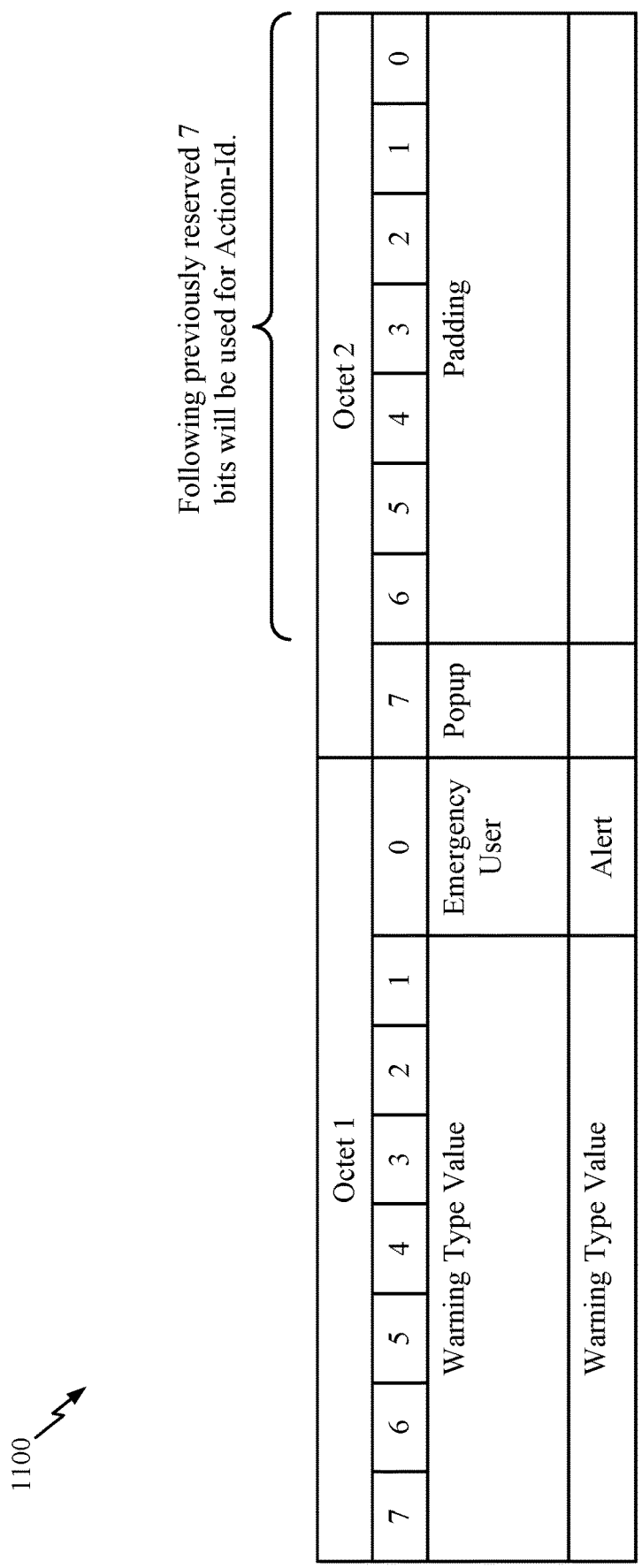
FIG. 11 illustrates a Warning-Type IE of SIB 10 for transmission of the Action-Id, in accordance with certain aspects of the present disclosure.

FIG. 11 illustrates a Warning-Type IE 1100 of SIB 10 for transmission of the Action-Id, in accordance with certain aspects of the present disclosure.

As shown in FIG. 11, the Warning-Type IE 1100 includes two Octets, namely Octet 1 and Octet 2. Octet 1 is currently used to indicate the Warning Type Value. The 7 bits of Octet 2 are currently reserved. In an aspect the bits of Octet 2 are zero padded. In certain aspects, the Action-Id information may be indicated by the currently unused bits of Octet 2 or a portion thereof.

Figure 12:
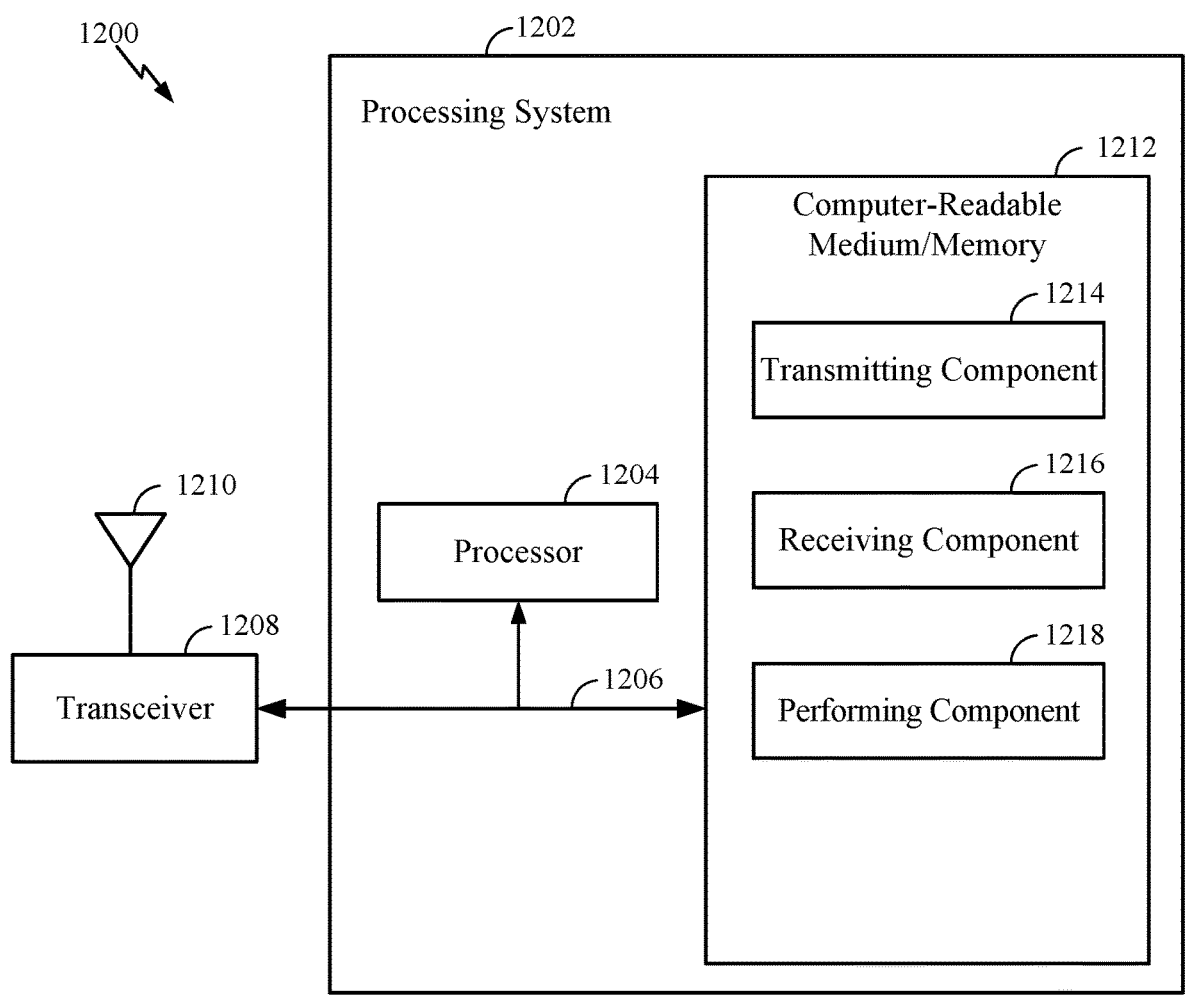
FIG. 12 illustrates a communications device that may include various components configured to perform operations for the techniques disclosed herein, such as the operations illustrated in FIG. 7, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIG. 7, or other operations for performing the various techniques discussed herein.

In certain aspects, the computer-readable medium/memory 1212 includes a transmitting component 1214 to cause the processor to perform the transmitting operation illustrated in FIG. 7. Additionally, the computer-readable medium/memory 1212 includes a receiving component 1216 to cause the processor 1204 to perform the receiving operations illustrated in FIG. 7. Additionally, the computer-readable medium/memory 1212 includes a performing component 1218 for causing the processor 1204 to perform the performing operation illustrated in FIG. 7. The transmitting component 1214, receiving component 1216, and performing component 1218 may be coupled to the processor 1204 via bus 1206. In certain aspects, the transmitting component 1214, receiving component 1216, and performing component 1218 may be hardware circuits. In certain aspects, the transmitting component 1214, receiving component 1216, and performing component 1218 may be software components that are executed and run on processor 1204.

Figure 13:
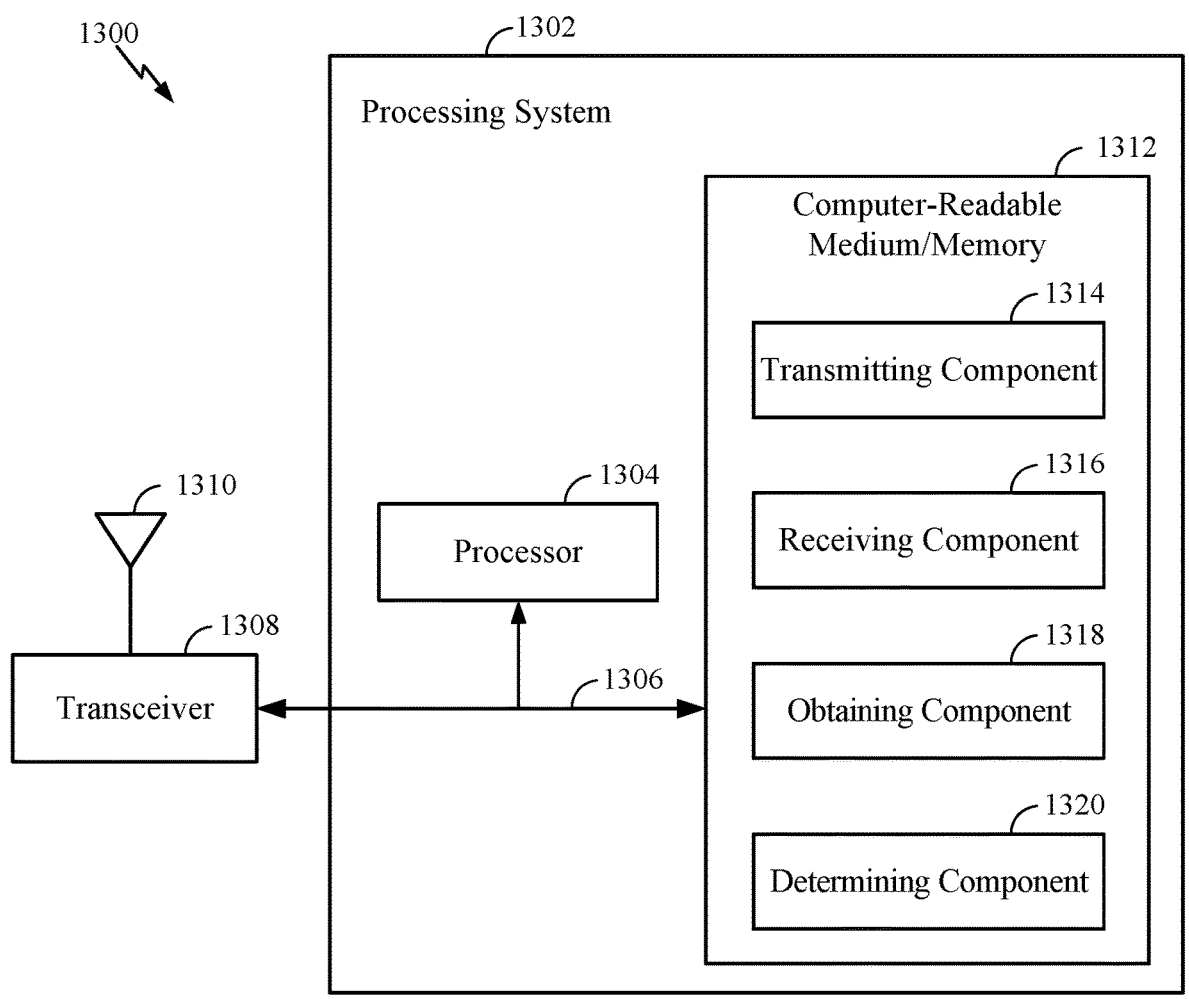
FIG. 13 illustrates a communications device that may include various components configured to perform operations for the techniques disclosed herein, such as the operations illustrated in FIG. 8, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signal described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIG. 8, or other operations for performing the various techniques discussed herein.

In certain aspects, the computer-readable medium/memory 1312 includes a transmitting component 1314 to cause the processor 1304 to perform the transmitting operation illustrated in FIG. 8. Additionally, the computer-readable medium/memory 1312 includes a receiving component 1316 to cause the processor 1304 to perform the receiving operation illustrated in FIG. 8. Additionally, the computer-readable medium/memory 1212 includes an obtaining component 1318 for causing the processor 1304 to perform the obtaining operation illustrated in FIG. 8. Additionally, the computer-readable medium/memory 1312 includes a determining component 1320 to cause the processor 1304 to perform the determining operation illustrated in FIG. 8. The transmitting component 1314, receiving component 1316, and obtaining component 1318, and the determining component 1320 may be coupled to the processor 1304 via bus 1306. In certain aspects, the transmitting component 1314, receiving component 1316, and obtaining component 1318, and the determining component 1320 may be hardware circuits. In certain aspects, the transmitting component 1314, receiving component 1316, and obtaining component 1318, and the determining component 1320 may be software components that are executed and run on processor 1304.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
   transmitting a first indication of UE capability for performing a first set of UE actions;
   receiving, based on the first indication, a second indication of a second set of UE actions the UE is to perform in response to receiving a warning message, the warning message including an identifier of a warning type associated with the second set of UE actions;
   receiving the warning message including the identifier of the warning type; and
   performing at least one of the second set of UE actions in response to receiving the warning message.

2. The method of claim 1, wherein the transmitting the first indication and the receiving the second indication are performed during a UE attach procedure to a Radio Access Network (RAN).

3. The method of claim 2, wherein the first indication is transmitted in an attach request message.

4. The method of claim 2, wherein the second indication is received in an attach accept message.

5. The method of claim 1, wherein the network to which the UE is attached to maintains a third set of UE actions corresponding to the identifier of the warning type, and wherein the second set of actions includes UE actions common to the first and the third set.

6. The method of claim 1, wherein the first indication includes a first bitmap, wherein each bit of the first bitmap represents a UE action.

7. The method of claim 6, wherein the second indication includes a second bitmap, wherein each bit of the second bitmap represents a UE action.

8. The method of claim 7, wherein the second bitmap is a logical AND of the first bitmap and a third bitmap of UE actions defined by the network for the warning type.

9. The method of claim 1, wherein the identifier of the warning type is received in a portion of a WARNING TYPE Information Element (IE) of System Information Block (SIB) Type 10.

10. The method of claim 1, wherein the UE actions include at least one of buzzer alarm, power off, location sharing, display a message, or invoke an Application Programming Interface (API) of an application running on the UE.

11. A method for wireless communication by a network node, comprising:
    obtaining a first set of defined UE actions corresponding to each of a set of warning types, each warning type identified by an identifier;
    receiving, from a User Equipment (UE), a first indication of UE capability for performing a second set of UE actions;
    determining, for each warning type in the set of warning types, based on the second set of UE actions and the first set of UE actions defined for the warning type, a third set of UE actions to be performed by the UE for the warning type; and transmitting, for the warning type to the UE, a second indication of the third set of UE actions and an identifier of the warning type.

12. The method of claim 11, further comprising transmitting a warning message including the identifier of the warning type to trigger the UE to perform at least one action from the third set of UE actions.

13. The method of claim 11, wherein the identifier of the warning type is transmitted in a portion of a WARNING TYPE Information Element (IE) of System Information Block (SIB) Type 10.

14. The method of claim 11, wherein the receiving the first indication and the transmitting the second indication are performed during a UE attach procedure to a Radio Access Network (RAN) including the BS.

15. The method of claim 14, wherein the first indication is received in an attach request message.

16. The method of claim 14, wherein the second indication is transmitted in an attach accept message.

17. The method of claim 11, wherein the first indication includes a first bitmap, wherein each bit of the first bitmap represents a UE action from the second set of UE actions.

18. The method of claim 17, wherein the second indication includes a second bitmap, wherein each bit of the second bitmap represents a UE action from the third set of UE actions.

19. The method of claim 18, wherein the first set of defined UE actions is represented by a third bitmap, wherein each bit of the third bitmap represents a UE action from the first set of UE actions, and
wherein the determining comprises determining the second bitmap as a logical AND of the first bitmap and a third bitmap of the UE actions defined by the network for the warning type.

20. The method of claim 11, wherein the UE actions include at least one of buzzer alarm, power off, location sharing, display a message, or invoke an Application Programming Interface (API) of an application running on the UE.

21. An apparatus for wireless communication by a User Equipment (UE), comprising:
at least one processor configured to:
transmit a first indication of UE capability for performing a first set of UE actions;
receive, based on the first indication, a second indication of a second set of UE actions the UE is to perform in response to receiving a warning message, the warning message including an identifier of a warning type associated with the second set of UE actions;
receive the warning message including the identifier of the warning type; and
perform at least one of the second set of UE actions in response to receiving the warning message; and
a memory coupled to the at least one processor.

22. An apparatus for wireless communication by a network node, comprising:
at least one processor configured to:
obtain a first set of defined UE actions corresponding to each of a set of warning types, each warning type identified by an identifier;
receive, from a User Equipment (UE), a first indication of UE capability for performing a second set of UE actions;
determine, for each warning type in the set of warning types, based on the second set of UE actions and the first set of UE actions defined for the warning type, a third set of UE actions to be performed by the UE for the warning type; and
transmit, for the warning type to the UE, a second indication of the third set of UE actions and an identifier of the warning type; and
a memory coupled to the at least one processor.

23. The apparatus of claim 22, wherein the at least one processor is further configured to transmit a warning message including the identifier of the warning type to trigger the UE to perform at least one action from the third set of UE actions.

24. The apparatus of claim 22, wherein the at least one processor performs the receiving the first indication and the transmitting the second indication during a UE attach procedure to a Radio Access Network (RAN) including the BS.

25. An apparatus for wireless communication by a User Equipment (UE), comprising:
means for transmitting a first indication of UE capability for performing a first set of UE actions;
means for receiving, based on the first indication, a second indication of a second set of UE actions the UE is to perform in response to receiving a warning message, the warning message including an identifier of a warning type associated with the second set of UE actions;
means for receiving the warning message including the identifier of the warning type; and
means for performing at least one of the second set of UE actions in response to receiving the warning message.

26. An apparatus for wireless communication by a network node, comprising:
means for obtaining a first set of defined UE actions corresponding to each of a set of warning types, each warning type identified by an identifier;
means for receiving, from a User Equipment (UE), a first indication of UE capability for performing a second set of UE actions;
means for determining, for each warning type in the set of warning types, based on the second set of UE actions and the first set of UE actions defined for the warning type, a third set of UE actions to be performed by the UE for the warning type; and
means for transmitting, for the warning type to the UE, a second indication of the third set of UE actions and an identifier of the warning type.

27. The apparatus of claim 26, further comprising means for transmitting a warning message including the identifier of the warning type to trigger the UE to perform at least one action from the third set of UE actions.

28. A computer-readable medium for wireless communication by a User Equipment (UE), storing instructions which when processed by at least one processor perform a method comprising:
transmitting a first indication of UE capability for performing a first set of UE actions;
receiving, based on the first indication, a second indication of a second set of UE actions the UE is to perform in response to receiving a warning message, the warning message including an identifier of a warning type associated with the second set of UE actions;
receiving the warning message including the identifier of the warning type; and
performing at least one of the second set of UE actions in response to receiving the warning message.

29. A computer-readable medium for wireless communication by a network node, storing instructions which when processed by at least one processor perform a method comprising:
- obtaining a first set of defined UE actions corresponding to each of a set of warning types, each warning type identified by an identifier;
- receiving, from a User Equipment (UE), a first indication of UE capability for performing a second set of UE actions;
- determining, for each warning type in the set of warning types, based on the second set of UE actions and the first set of UE actions defined for the warning type, a third set of UE actions to be performed by the UE for the warning type; and
- transmitting, for the warning type to the UE, a second indication of the third set of UE actions and an identifier of the warning type.

30. The computer-readable medium of claim 29, further comprising instructions for transmitting a warning message including the identifier of the warning type to trigger the UE to perform at least one action from the third set of UE actions.

* * * * *